(12) United States Patent
Takikura et al.

(10) Patent No.: US 6,651,916 B2
(45) Date of Patent: Nov. 25, 2003

(54) SPINNING-REEL BAIL-TRIPPING DEVICE

(75) Inventors: Koji Takikura, Izumi (JP); Takeshi Ikuta, Sakai (JP); Koji Ochiai, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/286,759

(22) Filed: Nov. 4, 2002

(65) Prior Publication Data
US 2003/0116666 A1 Jun. 26, 2003

(30) Foreign Application Priority Data
Dec. 25, 2001 (JP) ........................................ 2001-392511

(51) Int. Cl.[7] .............................................. A01K 89/01
(52) U.S. Cl. ...................... 242/231; 242/232; 242/233
(58) Field of Search ................................ 242/231, 232, 242/233

(56) References Cited

U.S. PATENT DOCUMENTS

| | | | | |
|---|---|---|---|---|
| 4,502,645 A | * | 3/1985 | Sazaki et al. | 242/231 |
| 5,098,031 A | * | 3/1992 | Hitomi | 242/233 |
| 5,613,644 A | * | 3/1997 | Karlsson | 242/232 |
| 5,667,159 A | * | 9/1997 | Carpenter et al. | 242/233 |
| 5,683,049 A | * | 11/1997 | Kawabe et al. | 242/232 |
| 6,371,395 B2 | * | 4/2002 | Sato | 242/232 |
| 6,382,542 B1 | * | 5/2002 | Sato | 242/243 |

FOREIGN PATENT DOCUMENTS

JP          10-04839 A1    1/1998

* cited by examiner

Primary Examiner—Kathy Matecki
Assistant Examiner—Evan Langdon
(74) Attorney, Agent, or Firm—Shinjyu Global IP Counselors, LLP

(57) ABSTRACT

Spinning-reel bail-tripping mechanism is a device for returning bail arm from line-releasing posture to line-retrieving posture as rotor rotates in line-retrieving direction. Bail-tripping mechanism includes shifting member that shifts front-to-rear as bail arm pivots; toggle-spring mechanism that urges and toggles bail arm to between the two postures; switching portion, and restraining mechanism. Switching portion comes into contact with the rear end of shifting member and shifts shifting member toward a first position. Restraining means restrains bail arm from returning into line-retrieving posture when bail arm is in line-releasing posture. Restraining means also releases restraint before the rear end of shifting member reaches the peak edge of first inclined face of switching portion as rotor rotates in line-retrieving direction while bail arm is in line-releasing posture. The present invention enables secure retention of bail arm in line-releasing posture, and eases its return from line-releasing posture into line-retrieving posture.

20 Claims, 10 Drawing Sheets

(a)

(b)

(a)

(b)

SPINNING-REEL BAIL-TRIPPING DEVICE

BACKGROUND OF THE INVENTION

1. Field of the Invention

This invention generally relates to bail-tripping devices. More specifically, the present invention relates to spinning-reel bail-tripping devices that return a bail arm that is pivotally mounted from a line-releasing posture to a line-retrieving posture as the rotor, which is rotatably mounted in the reel unit of spinning reel, is rotated in the line-retrieving direction.

2. Background Information

In general, a spinning-reel rotor is furnished with a bail arm for guiding fishing line onto the spool. The bail arm can assume a line-retrieving posture, in which the bail arm guides the fishing line onto the spool outer periphery when the fishing line is retrieved, and a line-releasing posture, in which the bail arm is flipped over from the line-retrieving position so that the bail arm does not get in the way when the fishing line is reeled out from the spool. The rotor is provided with a bail-tripping device for sustaining the bail arm in one of the line-retrieving posture and the line-releasing posture, and for restoring the bail arm from the line-releasing posture to the line-retrieving posture as the rotor rotates in the line-retrieving direction.

As a conventional bail-tripping device, the device disclosed in Japanese Laid-Open Patent Application No. 10-4839 is known. This bail-tripping device includes: a toggle spring, fitted to the rotor, with the fore end of the toggle spring being interlocked with the bail arm in vicinity of the pivotal center of the bail arm; a shifting member having the fore end that is interlocked with the bail arm in the vicinity of the pivotal center of the bail arm, and the base that shifts to and fro toward the reel unit; and a switching protrusion furnished on the reel unit to come into contact with the shifting member. The toggle spring toggles the bail arm between two postures, and urging and retaining the bail arm in either of the two postures. The toggle spring has a coil spring accommodated in a recess formed in one of the rotor's rotor arms, and a linking component urged by the coil spring. The linking component includes a shaft member pressed upon by the coli spring, and a link fitted to the fore end of the shaft member so as to be pivotable up to a predetermined extent. The fore end of the linking component is interlocked with the bail arm nearby the pivotal center of the bail arm.

When the bail arm is pivoted into the line-releasing posture in the bail-tripping device having this sort of configuration, the shifting member retracts into a position in which the shifting member comes into contact with the switching protrusion. In this situation in the toggle spring, the shaft member is retracted while the linking component pivots until passing the dead point. When the linking component passes the dead point, the shaft member urged by the coil spring is advanced. Then, when the rotor rotates in the line-retrieving direction, the shifting member is brought into contact with the switching protrusion and advances. The advancing of the shifting member pivots the linking component and meanwhile retracts the shaft member until the linking component passes the dead point. Then, when the linking component passes the dead point, the linking component advances, restoring the bail arm into the line-retrieving posture.

When fishing line is reeled out by casting a spinning reel in this manner, reverse rotation of the rotor is blocked; and after catching the fishing line with the thick of the index finger, the bail arm is tripped into the line-releasing posture. In this situation, the rotor is turned to bring the line roller along the fishing rod, so that the fishing line may be grasped readily. Then, in the course of flinging down the fishing rod, the index finger is released from the fishing line, and the tackle's arrival on the water is awaited. At the point the tackle has sunk suitably after arriving on the water, the handle is worked slightly in the reel-in direction to return the bail arm into the line-retrieving position by means of the bail-tripping device.

In the aforementioned conventional configuration, when the toggle spring urges the bail arm, the shaft member does not pivot; only the link pivots with respect to the shaft member. This means that the direction in which the coil spring urges, and the direction in which the linking component presses on the bail arm are different. The power transmitted from the shaft member to the bail arm via the linking component is consequently lessened by what the pivoting angle of the linking component is, which weakens the power with which the toggle spring retains the bail arm in the line-retrieving and the line-releasing postures. Where the toggle spring's retaining power is weakened in this way, the bail arm that has been put into the line-releasing posture during casting could be flipped over into the line-retrieving posture due to inertial force during the casting. If the spring force of the toggle spring is strengthened in order to prevent this, it will weigh on the handle in rotating the rotor in the line-retrieving direction. As a result, the bail arm will be sluggish in returning from the line-releasing posture into the line-retrieving posture.

In view of the above, there exists a need for spinning-reel bail-tripping device which overcomes the above mentioned problems in the prior art. This invention addresses this need in the prior art as well as other needs, which will become apparent to those skilled in the art from this disclosure.

SUMMARY OF THE INVENTION

A purpose of the present invention is to provide a spinning-reel bail-tripping device in which the bail arm can be securely retained in the line-releasing posture, and the bail arm can return from the line-releasing posture into the line-retrieving posture easily.

A spinning-reel bail-tripping device in accordance with the first aspect of the present invention is a device for returning a bail arm from the line-releasing to the line-retrieving posture as a rotor rotates in the line-retrieving direction. The bail arm is mounted on the rotor so as to be pivotable between line-retrieving and line-releasing postures. The bail-tripping device is furnished with a shifting member, a toggle-spring mechanism, a switching portion, and a restraining means. The shifting member, furnished on the rotor, is a component whose fore end is interlocked with the bail arm, and whose rear end is shiftable at least front-to-rear between a first position and a second position, in cooperation with the pivoting of the bail arm. The first position is parted away from the reel body and corresponds to the line-retrieving posture. The second position is adjoining the reel body and corresponds to the line-releasing posture. The toggle-spring mechanism, whose fore end is rotatably interlocked with the bail arm in a position different from the bail arm's shifting-member interlocking position, is a device for urging toggling the bail arm to between the line-retrieving and line-releasing postures. The switching portion is provided on a front portion of the reel body and has a first inclined face whose end downstream in the rotor line-retrieving rotational direction projects more from a front face of the reel body than its upstream end. The switching portion is for shifting the shifting member beyond the dead point of the toggle-spring mechanism and toward the first position by the first inclined face coming into contact with the rear end of the shifting member that is in the second position when the rotor is rotated in the line-retrieving direction. The restraining means is furnished in between the bail arm and the rotor, and is a means for restraining the bail arm from returning into the line-retrieving posture when the bail arm is disposed in the line-releasing posture. The restraining means is also for releasing the restraint before the rear end of the shifting member reaches the peak edge of the first inclined face by the rotor rotating in the line-retrieving direction with the bail arm disposed in the line-releasing posture.

When the bail arm flips from the line-retrieving posture to the line-releasing posture in this bail-tripping device, the rear end of the shifting member shifts into the second position. In that situation, the toggle-spring mechanism, once having been compressed up to the dead point, thereafter extends and urges the bail arm into the line-releasing posture. When the bail arm is situated in the line-releasing posture it is restrained against returning to the line-retrieving posture. As a result, when casting with the bail arm in the line-releasing posture, the bail arm is not liable to flip back toward the line-retrieving posture. In this state, when the rotor rotates in the line-retrieving direction, the rear end of the shifting member being shifted into the second position comes into contact with the first inclined face on the switching portion. Then, the rear end shifts gradually toward the peak edge, which presses the shifting member into the first position and presses the bail arm into the line-retrieving posture. In the midst of this shifting, restraint by the restraining means is released before the fore end of the shifting member reaches the peak edge of the first inclined face. Then, when the toggle-spring mechanism passes the toggle-spring mechanism's dead point, the toggle-spring extends, pressing the bail arm into the line-retrieving posture. Meanwhile, the bail arm is pressed upon by the switching portion until the peak edge is reached. Consequently, with its restraint off, the bail arm is tripped into the line-releasing posture and retained in that posture. Herein, when in the line-releasing posture, the bail arm is restrained by the restraining means and is not liable to return to the line-retrieving posture. Accordingly, the bail arm is securely retained in the line-releasing posture. Likewise, since the restraint from the restraining means is released before the peak edge of the pressing-force-producing first inclined face is reached during the sweep to the line-retrieving posture, the spring force of the toggle spring does not have to be strong. Accordingly, allows the bail arm to return more readily to the line-retrieving posture.

A spinning-reel bail-tripping device in accordance with the second aspect of the invention is the device set forth in the first aspect, wherein the restraining means releases the restraint before the toggle-spring mechanism goes beyond the dead point, as the bail arm pivots into the line-retrieving posture. In this case, the restraint is released before the toggle-spring goes beyond the dead point. Accordingly, during a casting, the bail arm pivots toward the line-releasing posture under inertial force and is restrained by the restraining means, which stops the pivoting. As a result, the bail arm is returned to the line-releasing posture by the toggle-spring mechanism.

A spinning-reel bail-tripping device in accordance with the third aspect of the invention is the device set forth in the first or second aspect, wherein the fore end of the shifting member is bent toward the vicinity of the bail-arm pivotal center so as to parallel its pivotal axis, and the rear end thereof is bent toward the rotor's rotational axis. The intermediate portion therebetween is a part disposed paralleling the rotor's rotational axis. The intermediate portion is interlocked with the rotor so as to be shiftable front-to-rear. The fore end is interlocked into an engagement recess formed in the bail arm so as to be pivotable in the bail-arm pivoting direction. In this case, when the bail arm pivots, the fore end of the shifting member interlocked with the engagement recess turns about the pivotal center. The intermediate portion of the shifting member thereby reciprocates, interlocked with the rotor. Herein, just by interlocking the bent-formed fore end of the shifting member with the engagement recess in the bail arm, and by shiftably interlocking the intermediate portion, the pivoting movement of the bail arm is converted in a simple manner into the front and rear linear movement of the shifting-member rear end.

A spinning-reel bail-tripping device in accordance with the fourth aspect of the present invention is the device set forth in any of first through third aspects, wherein the restraining means includes: a restraining pin mounted on one of either the bail arm or the rotor to allow it to advance and retreat toward the other; an urging member for urging the restraining pin toward the other; and a pressing portion provided on the other of the bail arm and the rotor, projecting toward the one of the bail arm and the rotor so as to press the restraining pin in its retracting direction. Under these conditions, the pressing portion is positioned past the restraining pin by the time the toggle spring mechanism goes beyond the dead point. In this case, the restraining pin pressing on the other of the components imparts resistance to the bail arm. Meanwhile, the resistance is enlarged by the pressing portion causing the restraining pin to retract, which restrains the bail arm from flipping back into the line-retrieving posture. Since the bail arm is restrained by the pressing portion and the restraining pin from flipping back, and since the pressing portion is positioned such that the restraint is released by the pressing portion passing the restraining pin by the time the fore end of the shifting member reaches the peak edge of the first inclined face of the switching portion, a toggle-spring mechanism having only small spring force can cause the return from the line-retrieving posture to the line-releasing posture. What is more, since the projecting pressing portion is caused to surpass a restraining pin while the restraining pin is urged by the urging means, a sound is generated as the restraining pin advances. Therefore, because the sound issues in the vicinity of the line-releasing posture, change in the bail arm's posture may be confirmed without making a visual inspection.

A spinning-reel bail-tripping device in accordance with the fifth aspect of the present invention is the device set forth in any of first through third aspects, wherein the restraining means includes: an elastic member provided on one of the bail arm and the rotor; a contact portion provided on the other of the bail arm and the rotor. The contact portion is in contact with the elastic member when the bail arm is in the line-releasing posture, and is parted away from the elastic member before the toggle-spring mechanism passes the dead point. In this case, by providing an elastic member and a contact portion to restrain swinging of the bail arm by resistance from contact between the two, the configuration of the restraining means is made simple.

A spinning-reel bail-tripping device in accordance with the sixth aspect of the present invention is the device set forth in any of the first through fifth aspects, wherein the toggle-spring mechanism includes: a shaft member one end of which is interlocked with the bail arm; and a spring element being interlocked respectively on one end with the shaft member and the other end with the rotor for urging the shaft as guided by the rotor. The configuration of the toggle-spring mechanism is simplified in this case, which serves to lighten the weight of the toggle-spring mechanism.

A spinning-reel bail-tripping device in accordance with the seventh aspect of the invention is the device set forth in any of the first through sixth aspects, wherein the dead point of the toggle-spring mechanism is deviated toward the line-releasing posture by establishing it in a range, assuming the bail arm's pivoting sweep going from the line-retrieving posture to the line-releasing posture is 10, of from 8:2 to 9.5:0.5. In this case, the amount by which the switching portion protrudes for returning the bail arm from the line-releasing posture to the line-retrieving posture by rotation of the rotor in the line-retrieving direction may be lessened, which makes the bail arm flip back more readily.

A spinning-reel bail-tripping device in accordance with the eighth aspect of the present invention is the device set forth in any of the first through seventh aspects, wherein the switching portion is formed in continuity with the peak portion of the first inclined face, and has a second inclined face whose projecting extent diminishes heading from the peak portion of the first inclined surface, toward the line-retrieving rotational direction downstream-end. In this case the first inclined face and the second inclined face form a hill shape having sloped sides. Since the shifting member will be guided smoothly by the second inclined face, forming the second inclined face makes damage to the shifting member unlikely to be caused in the event that the shifting member comes into contact with the switching portion when the rotor rotates in the line reel-out direction in the line-releasing posture.

A spinning-reel bail-tripping device in accordance with the ninth aspect of the invention is the device set forth in any of the first through eighth aspects, further comprising a brake element, which is made of an elastic material and is provided on the front portion of the reel unit. The brake element is contactable with the rear end of the shifting member that is shifted into the second position. In this case, the rotor is braked by the projecting other end of the shifting member coming into contact with the brake element when the bail arm swings into the line-releasing posture and the shifting member shifts into the second, reel-unit-ward position. Therefore, the shifting member furnished for flipping the bail over has a dual use as a component for braking. Meanwhile, though the bail arm is swung into the line-retrieving posture after the rotor has been rotated into rotational phases respectively appropriate for casting and feathering, the rotor will not be prone to slipping out of its rotational phase.

A spinning-reel bail-tripping device in accordance with the tenth aspect of the invention is the device set forth in the ninth aspect, wherein at least a part of the inclined faces of the switching portion protrudes more toward the rotor than does a portion of the brake element that comes into contact with the shifting member. This ensures that, even with the provision of the brake element, the shifting member abuts securely on the switching portion so that the bail arm may return from the line-retrieving to the line-releasing posture.

A spinning-reel bail-tripping device in accordance with the eleventh aspect of the invention is the device set forth in the ninth or the tenth aspect, wherein the brake element has a braking surface constituted by a circumferential face, at least one outer peripheral portion of which is flat. Thus, the projecting rear end of the shifting member that is shifted into the second position comes into contact with the braking surface. In this case, when the rear end of the shifting member comes into contact with the braking face, the shifting-member shifting direction (front-to-rear direction) and the brake-element compressing direction (diametric direction) are orthogonal. Therefore, even if the shifting member's second position is out of kilter, the amount by which the brake element is compressed is not liable to fluctuate, whereby the braking force when in the line-releasing posture will not be prone to varying.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
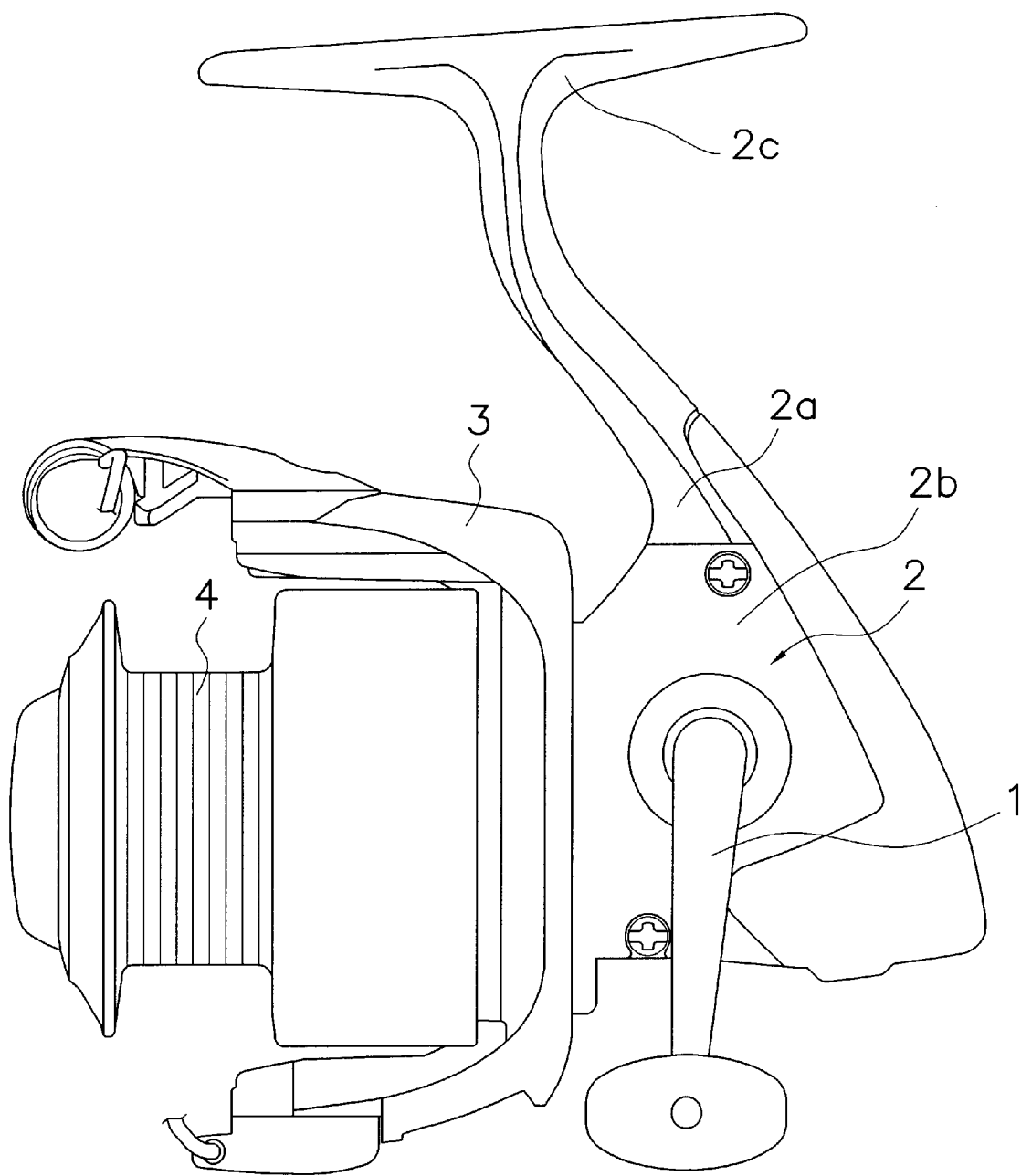
FIG. 1 is a left-side view of a spinning reel in accordance with a first embodiment of the present invention.
Figure 2:
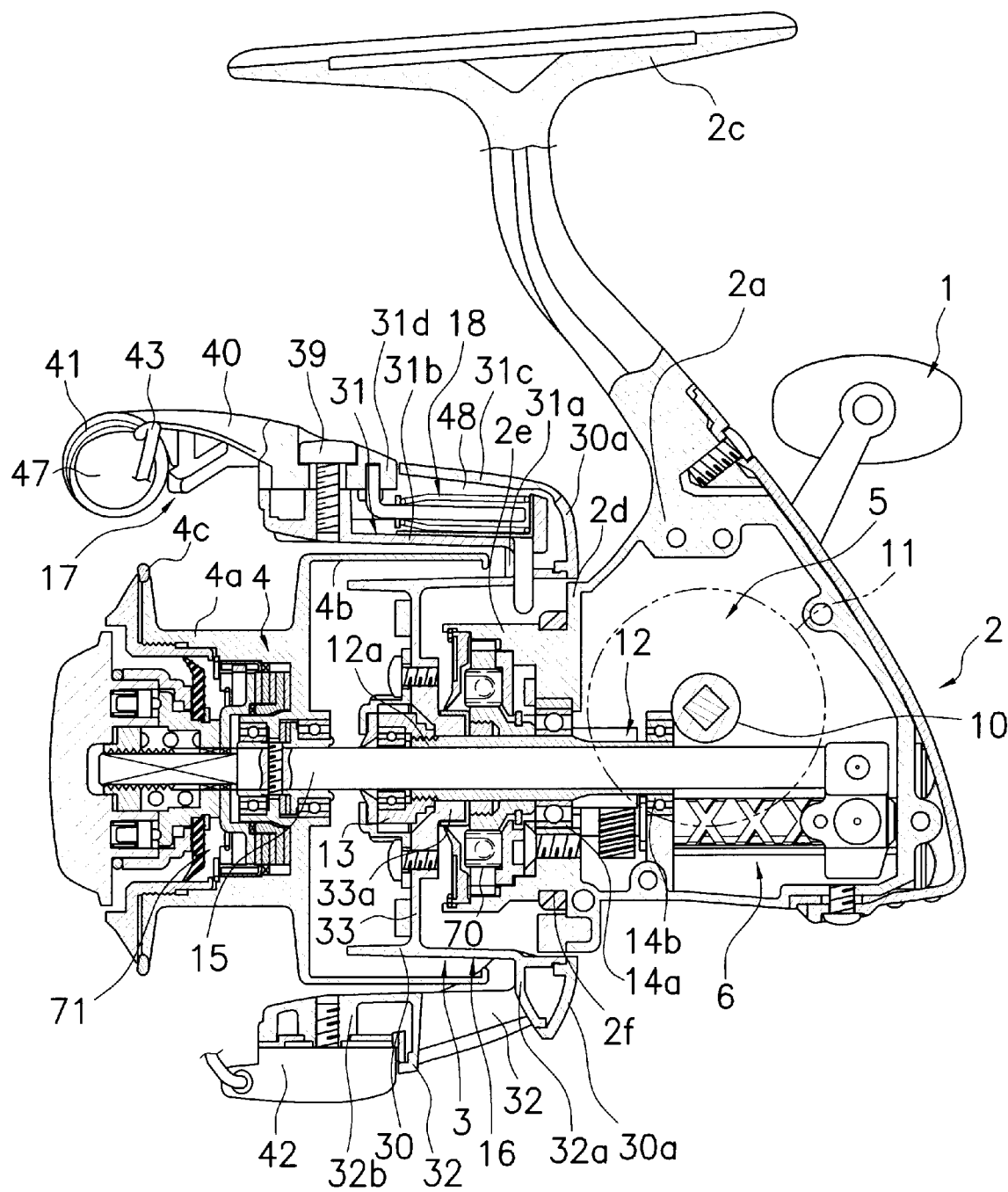
FIG. 2 is a left-side cross-sectional view of the spinning reel in accordance with the first embodiment of the present invention.

As shown in FIGS. 1 and 2, a spinning reel in which an embodiment of the present invention is adopted is equipped with a handle 1, a reel unit 2 rotatably carrying the handle 1, a rotor 3, and a spool 4. The rotor 3 is rotatably carried on the front portion of the reel unit 2. The spool 4, onto the circumferential surface of which fishing line winds, is disposed on the front portion of the rotor 3 such that the spool 4 can shift front and rear. The handle 1 is fitted onto the left side of the reel unit 2 in FIG. 1, and onto the right side in FIG. 2. In this way, the handle 1 is attachable to either the right/left sides of the reel unit 2.

The reel unit 2 includes a reel body 2a having an interior space, and a lid member 2b mounted detachably/reattachably on the reel body 2a in order to close off the space in the reel body 2a.

Figure 5:
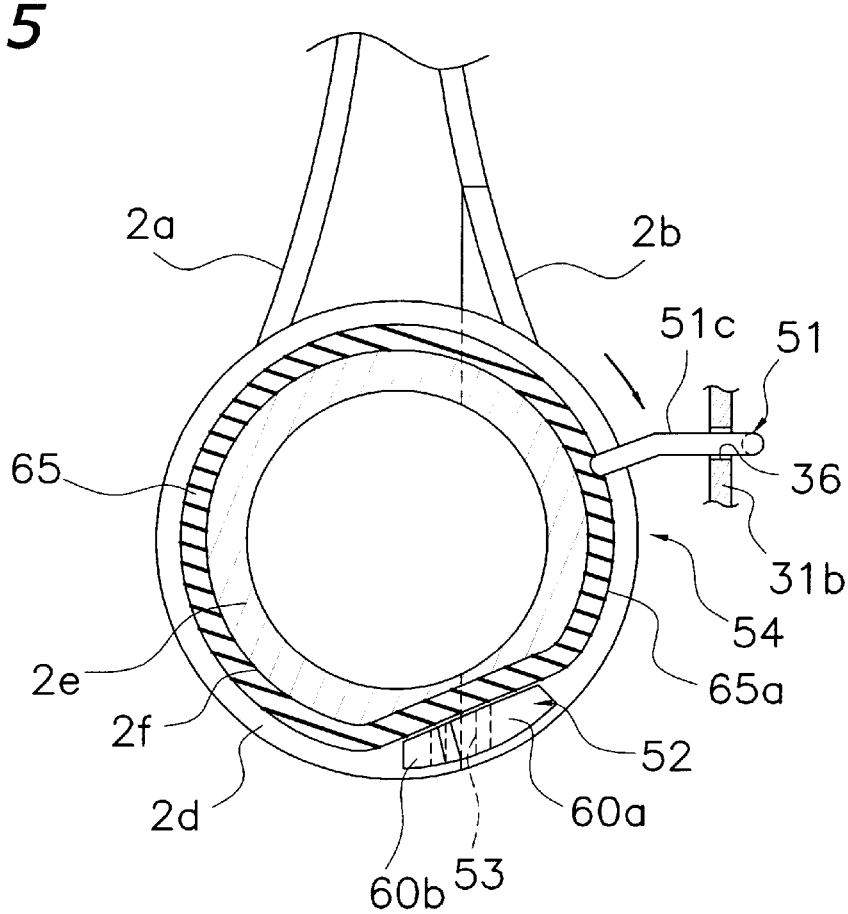
FIG. 5 is an elevational view of reel unit with the bail-tripping mechanism in accordance with the first embodiment of the present invention.

The reel body 2a is made, for example, of an aluminum alloy, and is formed unitarily with a T-shaped rod attachment leg 2c extending back and forth at the top. As shown in FIG. 2, a rotor driving mechanism 5 that in cooperation with rotation of the handle 1 rotates the rotor 3, and an oscillating mechanism 6 that pumps the spool 4 back and forth to wind fishing line uniformly are provided within the space in the reel body 2a. A circular flange portion 2d, and a cylindrical portion 2e which is smaller in diameter than the flange portion 2d and whose fore end is open, are formed on the front end of the reel body 2a and the lid member 2b. A mounting groove 2f is formed in the cylindrical portion 2e. The mounting groove 2f has, as shown in FIG. 5, which in cross-section in a D-shape, which is a circle with a part lopped off.

Figure 6:
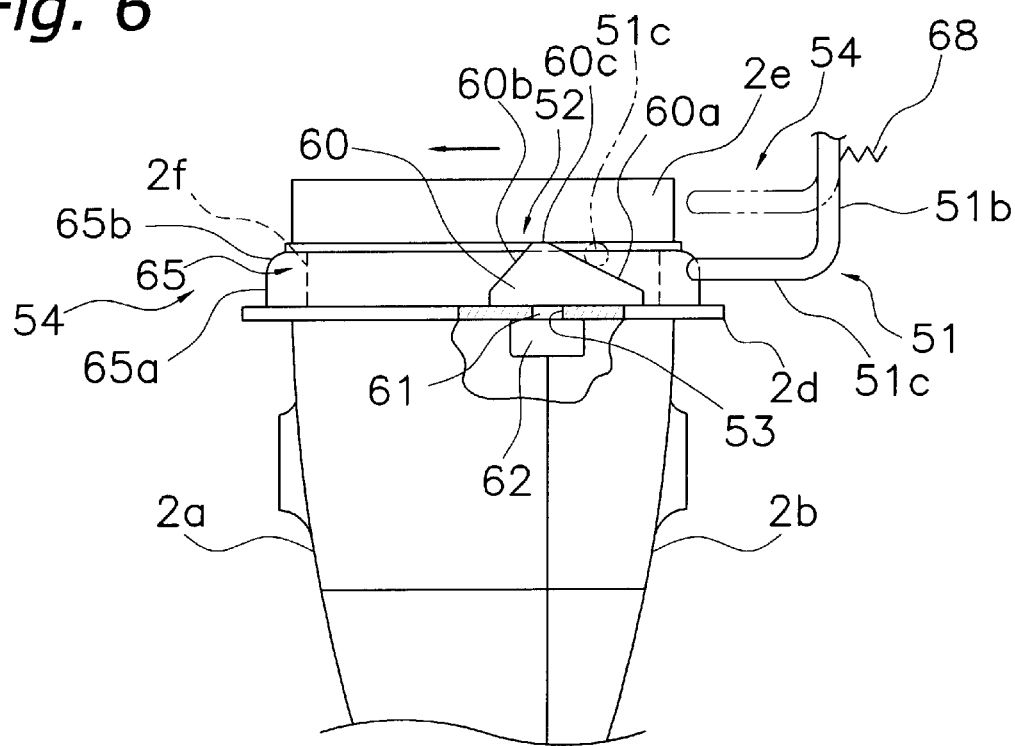
FIG. 6 is an underside fragmentary view of reel unit showing bail-tripping mechanism in accordance with the first embodiment of the present invention.

The lid member 2b, which is a component made of, for example, an aluminum alloy, is screw-fastened to the reel body 2a in, for example, three places. As shown in FIGS. 5 and 6, a later-described switching member 52 is detachably/reattachably mounted in the flange portion 2d where the reel body 2a and the lid member 2b split.

As shown in FIG. 2, the rotor driving mechanism 5 includes a handle shaft 10 into which the handle 1 is non-rotatably fitted, a face gear 11 that rotates together with the handle shaft 10, and a pinion gear 12 that meshes with the face gear 11. The pinion gear 12 is tubularly formed. A front portion 12a of the pinion gear 12 is fixed with a nut 13 to the rotor 3, penetrating the center part of the rotor 3. The axial middle and rear-end portions of the pinion gear 12 are rotatably supported via respective bearings 14a and 14b in the reel unit 2.

The oscillating mechanism 6 is a machine for shifting the spool shaft 15 in the front-to-rear direction to pump the spool 4 in the same direction. The spool shaft 15 is coupled via a drag mechanism 71 to the center part of the spool 4.

Rotor Configuration

As shown in FIG. 2, the rotor 3 includes a rotor unit 16; a bail arm 17 mounted on the fore end of the rotor unit 16 so as to be pivotable between a line-releasing posture and a line-retrieving posture; and a bail-tripping mechanism 18 mounted on the rotor unit 16. The bail-tripping mechanism 18 returns the bail arm 17 from the line-releasing posture into the line-retrieving posture.

The rotor unit 16 includes a cylindrical portion 30 mounted on the reel body 2a so as to be rotatable about the spool shaft 15, and first and second rotor arms 31, 32 furnished laterally opposing each other on the cylindrical portion 30. The cylindrical portion 30 and the two rotor arms 31, 32 are made of for example an aluminum alloy, and are formed unitarily.

A front wall 33 is formed in the front portion of the cylindrical portion 30, and a boss portion 33a is formed in the center of the front wall 33. A through-hole is formed in the center part of the boss portion 33, and the spool shaft 15 and the front portion 12a of the pinion gear penetrate the through hole. The nut 13 for fastening the rotor 3 is disposed in the front portion of the front wall 33. The rear face of the cylindrical portion 30 is covered by a third cover member 30a.

Figure 3:
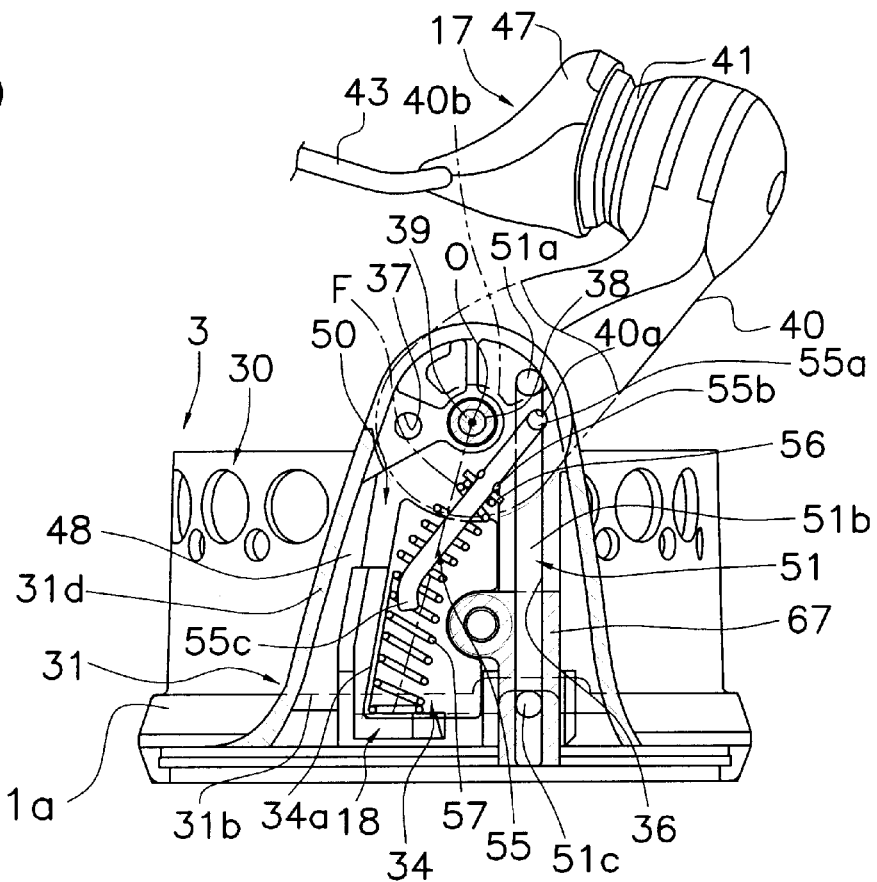
FIG. 3 is a partially-cross-sectional plan view of first rotor arm and bail arm in accordance with the first embodiment of the present invention, with the bail arm being in the line-retrieving posture in FIG. 3(a), and in the line-releasing posture in FIG. 3(b)
Figure 3:
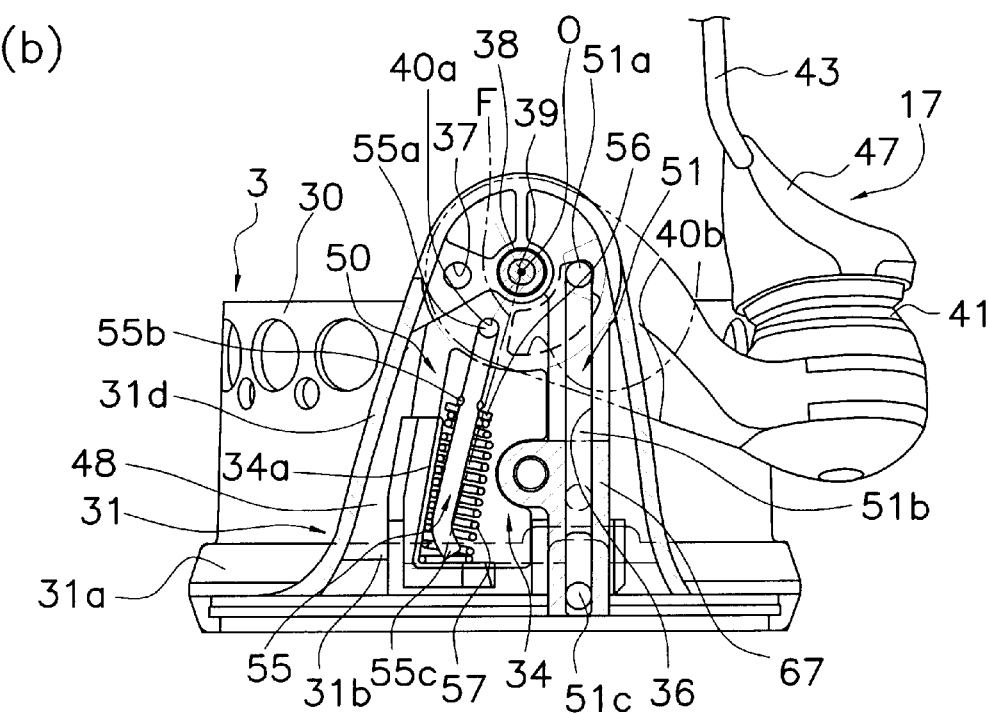
Figure 4:
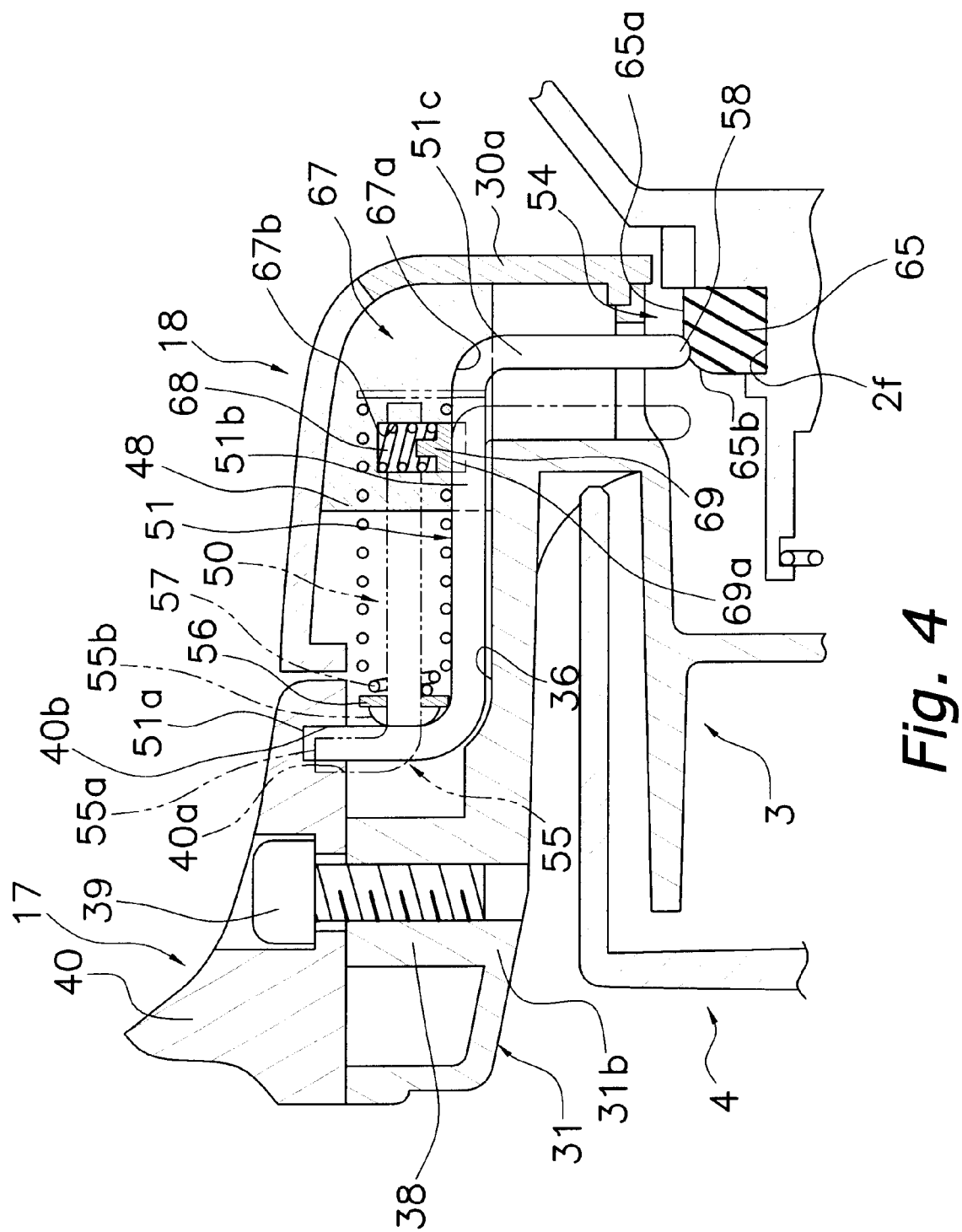
FIG. 4 is an enlarged cross-sectional view of the first rotor arm in accordance with the first embodiment of the present invention.

The first and second rotor arms 31, 32 include, as shown in FIGS. 2 through 4: first and second joints 31a, 32a respectively disposed on the circumferential surface of the rear portion of the cylindrical portion 30; first and second arm portions 31b, 32b which are curving in an outward bulge and extending frontward respectively from the first and second joints 31a, 32a; and first and second cover members 31c, 32c respectively covering the outer areas of both the two joint 31a, 32a and the two arm portions 31b, 32b. The first and second joints 31a, 32a are each formed in smooth peripheral continuity with the cylindrical portion 30.

The first and second arm portions 31b, 32b are formed in smooth continuity with the first and second joints 31a, 32a, and extend frontward spaced apart from the cylindrical portion 30. The first and second arm portions 31b, 32b curve smoothly from their tips toward where they join with the cylindrical portion 30. Apertures 31d and 32d are respectively formed in outer-side areas both on the two joints 31a, 31b and on the two arm portions 31b, 32b. The first and second cover members 31c, 32c respectively close over the apertures 31d, 32d along the circumferential sides. An accommodation space 48 is formed between the first cover member 31c, and the first joint 31a and first arm portion 31b.

Figure 9:
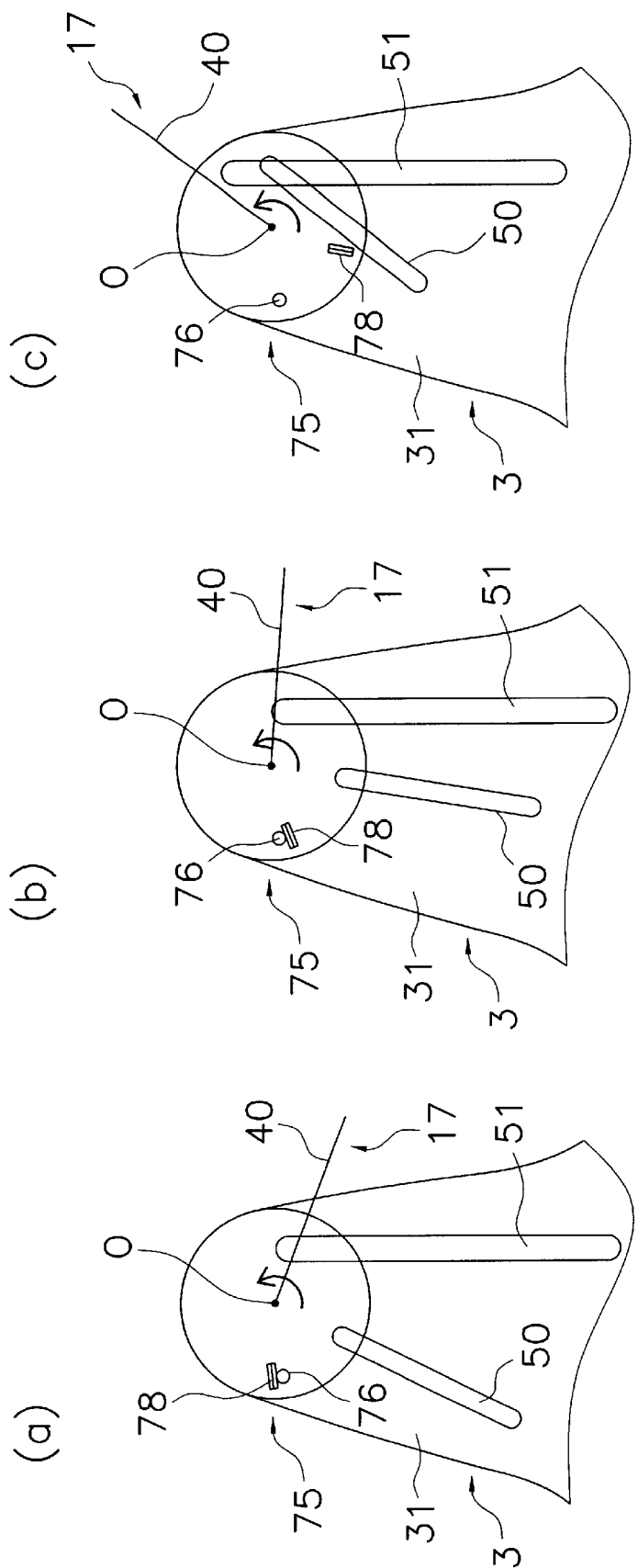
FIG. 9 is a schematic view showing changes in restraint status during swing of bail arm, with the bail arm being in the line-releasing posture in FIG. 9(a), and in the line-retrieving posture in FIG. 9(c)

A first bail-support member 40 is pivotably mounted on the outer peripheral side of the fore end of the first rotor arm 31b. As shown in FIGS. 3 and 4, the first arm portion 31b is formed with: a guide groove 36 for guiding back and forth a later-described shifting member 51 in the bail-tripping mechanism 18; a mounting hole 37 into which a restraining mechanism 75 (see FIG. 9) for imparting resistance to the bail arm 17 is fitted; and a boss portion 38 having a threaded hole for pivotably mounting the first bail-support member 40.

A second bail-support member 42 is pivotably mounted on the outer peripheral side of the fore end of the second arm portion 32b.

The first bail-support member 40 is attached to the first rotor arm 31 by an attachment pin 39 that is screwed into the boss portion 38 on the first arm portion 31b. The attachment pin 39 is an Allen screw essentially free of burrs, making it unlikely that fishing line will get caught on the head.

As shown in FIG. 3, a line roller 41 for guiding fishing line onto the spool 4, and a stationary-shaft cover 47 that with the first bail-support member 40 sandwiches the line roller 41, are mounted on the fore end of the first bail-support member 40. The line roller 41 is mounted free to rotate on the fore end of the first bail-support member 40. The stationary-shaft cover 47 is shaped like a deformed cone with a pointed tip. A bail 43, whose configuration is a wire bent into an approximate U-shape, is fixed between the tip portion of the stationary-shaft cover 47 and the second bail-support member 42. The first and second bail-support members 40 and 42, the line roller 41, the bail 43, and the stationary-shaft cover 47 constitute the bail arm 17, which guides fishing line onto the spool 4. The bail arm 17 is allowed to pivot between the line-retrieving posture shown in FIG. 3(*a*) and the line-releasing posture shown in FIG. 3(*b*), where the bail arm 17 is tripped over from the line-retrieving posture.

Bail-Tripping-Mechanism Configuration

The bail-tripping mechanism 18 is disposed within the accommodation space 48 in the first rotor arm 31. The bail-tripping mechanism 18 is provided for restoring, as the rotor 3 rotates, the bail arm 17 from the line-releasing posture into the line-retrieving posture and for retaining its status in either posture.

As shown in FIGS. 3 through 6, the bail-tripping mechanism 18 includes: a toggle-spring mechanism 50 within the accommodation space 48 and pivotably fitted to the first arm portion 31*b*; a shifting member 51 fitted allowing it to shift approximately front-to-rear in the accommodation space 48; a switching member 52 mounted detachably/reattachably on the flange portion 2*d*, where the switching member 52 can come into contact with the shifting member 51; a rotor braking mechanism 54 that has a brake element 65 for braking the rotor 3; and the restraining mechanism 75 for restraining the bail arm 17 in the line-releasing posture from being restored to the line-retrieving posture.

Toggle-Spring-Mechanism Configuration

The toggle-spring mechanism 50 as shown in FIG. 3 is arranged within the first rotor arm 31 such that the toggle-spring mechanism 50 is able to assume a first position in which the bail arm 17 is put into the line-retrieving posture, and a second position in which the bail arm 17 is put into the line-releasing posture. The toggle-spring mechanism 50 serves as a mechanism for retaining the bail arm 17 in the line-retrieving and in the line-releasing postures. The toggle-spring mechanism 50 includes: a rod 55, one end of which is interlocked with the first bail-support member 40, and the other end of which extends along the first arm portion 31*b*; and a coil spring 57 that outwardly urges the rod 55.

The rod 55 in its fore end has, as shown in FIG. 4, an interlocking portion 55*a* bent over towards the first bail-support member 40 so as to interlock with an engagement hole 40*a* in the first bail-support member 40. Likewise, the rod 55 in its mid-portion has a lock protrusion 55*b* for locking the fore-end portion of the coil spring 57, and in its rear end has a slightly bent curved portion 55*c* (see FIG. 3). A washer 56 against which the fore end of the coil spring 57 abuts is fitted onto the lock protrusion 55*b*. In this manner, power from the fore-end portion of the coil spring 57 is uniformly transmitted to the rod 55.

The coil spring 57 contacts on and is guided by a guide seat 34. The guide seal 34 is fitted in the first arm portion 31*b*, and made of a synthetic polymer such as a synthetic polyamide resin. The guide seat 34 has a wall-face portion 34*a* bent over such that the wall-face portion 34*a* guides the side of the coil spring 57, and such that the guide seat 34 locks the basal end of the coil spring 57. The wall-face portion 34*a* is of height enabling it to be in lateral and basal contact with the coil spring 57. This facilitates the extension/compression of the coil spring 57, and prevents damage from being caused to the first arm portion 31*b* when the coil spring 57 extends/compresses.

The coil diameter of the fore-end portion of the coil-spring 57 that is locked by the washer 56 is smaller than that the rest of the coil-spring 57. This way, a large clearance is secured between the coil spring 57 other than the fore-end portion and the rod 55, which keeps the coil spring 57 from deforming regardless of how the rod 55 is situated inside the coil spring 57. Additionally, a boss portion that contacts the inner-circumferential surface of the coil-spring 57 basal end, and a cover portion that covers the basal-end outer-circumferential surface, may be provided to lock the basal end of the coil spring 57. Likewise, these boss and cover portions may be mounted in the arm portion 31*b* so as to pivot about an axis parallel to the pivotal axis of the first bail-support member 40. Conceivable, for example, would be a configuration in which an arcuate bulge is formed in the base-end face of the boss portion, and meanwhile an arcuate recess into which the arcuate bulge engages is formed within the arm portion 31*b*, thereby allowing the boss portion to pivot.

The thus-configured toggle-spring mechanism 50 is arranged such that the rod 55 interlocks with the first bail-support member 40 on different sides with respect to a line segment F depending on whether the first bail-support member 40 is in the line-retrieving posture or the line-relieving posture. The line segment F connects the center of the basal-end of the coil spring 57 and the pivotal axis O of the first bail-support member 40 (center axis of the attachment pin 39). The toggle-spring mechanism 50 comes to the dead point of (position at which the coil spring 57 is most compressed) when the fore-end of the rod 55 passes the line segment F. Accordingly, the toggle-spring mechanism 50 straddling the dead point toggles between and urges the bail arm 17 into the two postures, and retains it in either of the two postures. The dead point of the toggle-spring mechanism 50 is deviated toward the line-releasing posture. Specifically, supposing that the pivoting sweep of the bail arm 17 were 10, the dead point would be established in a 9:1 position heading from the line-retrieving posture side to the line-releasing posture side in the pivoting sweep. The dead-point position is preferably set within a range of from 8:2 to 9.5:0.5. Setting the position of the dead point within such range lessens the amount by which the switching member 52 is compressed for pressing the shifting member 51 to pass the dead point when returning from the line-releasing posture to the line-retrieving posture. Accordingly, a small amount of projection of the switching member 52 should suffice.

The shifting member 51 is a component formed by bending either end of a wire by 90 degrees in different directions as shown in FIG. 4. The shifting member 51 is made of metal such as a stainless steel. The shifting member 51 is mounted in the first arm portion 31*b* so as to be shiftable approximately front-to-rear between a first position (parted-off position) shown in FIG. 3(*a*), and a second position (contact position) shown in FIG. 3(*b*). As shown in FIGS. 3 through 6, the fore-end portion 51*a* of the shifting member 51 is bent over radially outward and interlocked with an approximately fan-shaped engagement slot 40*b* formed in the first bail-support member 40. The intermediate portion 51*b* extends along the first arm portion 31*b*, diametrically inward of the rod 55.

The rear-end portion 51*c*, whose hind-end face is lent a slight roundness, passes through the guide groove 36 and extends inward to a position where the rear-end portion 51*c* slightly overlaps the front-end face of the brake element 65 that composes the rotor braking mechanism 54. The width of the guide groove 36 is of roughly the same dimension as the diameter of the shifting member 51. Accordingly, the diametrically inward side of the intermediate portion 51*b* is guided back and forth along the guide groove 36 as the bail arm 17 pivots. The outer peripheral side of the bent portion between the intermediate portion 51b and the rear-end portion 51c is guided in the front-to-rear and diametric directions by a guide member 67. Inside the guide member 67, which is fixed to the first cover member 31c, a slot 67a, curved so as to nestle the rear-end portion 51c, is formed.

In the guide member 67, a round-columnar mounting hole 67b, into which a compression spring 68, in other words a coil spring can fit, is formed opening onto the slot 67a. The compression spring 68 is fitted into the mounting hold 67b in the compressed state. By pressing on the intermediate portion 51b of the shifting member 51, the rear-end portion 51c is urged toward a (later-described) braking face 65a formed on the outer periphery of the brake element 65. A pressing member 69, in which a semicircular arcuate recess 69a is formed so as to engage the outer peripheral surface of the intermediate portion 51b of the shifting member 51, is fitted into the tip of the compression spring 68. The pressing member 69 is furnished for efficiently transmitting the urging force of the compression spring 68 to the intermediate portion 51b of the shifting member 51, while allowing the intermediate portion 51b to shift back and forth.

By urging the shifting member 51 toward the braking face 65a in this way, even if, due to discrepancies in attachment of the reciprocating shifting member 51, chatter in the pressing direction oriented toward the brake element 65 is produced in the shifting member 51, the chatter is nullified by the compression spring 68; and the shifting member 51 is pressed upon by the compression spring 68 with constant urging force. This suppresses fluctuations in braking force due to chatter in the compression direction heading toward the braking face 65a.

When the bail arm 17 is in the line-releasing posture, the end of the shifting member 51 that interlocks with the engagement slot 40b is positioned to the line-retrieving-posture side of a line segment that connects the rear-end portion 51c and the pivotal center O of the bail arm 17. In particular, the shifting member 51 is arranged such that, regardless of whether the shifting member 51 is in the first position (parted-off position) or the second position (contact position), the location in which the shifting member 51 interlocks with the first bail-support member 40 is present on the same side relative to the line segment that connects the rear-end portion 51c when the shifting member 51 is in the contact position (FIG. 3(b)) and the pivot center of the first bail-support member 40. This enables the first bail-support member 40 to be restored into the line-retrieving posture when the rear-end portion 51c of the shifting member 51 is pressed upon by the switching member 52. When the shifting member 51 is in the contact position, the end face of the rear-end portion 51c bites into the brake element 65 a bit depth-ward beyond its front-end face, and inward from its outer peripheral surface. Therefore, even if the amount by which the shifting member 51 shifts should fluctuate slightly, the same braking force is always obtained.

The switching member 52, which is a component made of a synthetic polymer such as a synthetic polyamide resin or polyacetal for example, as shown in FIGS. 5 and 6, is mounted detachably/reattachably on the flange 2d where the reel body 2a and the lid member 2b split apart. A rectangular notch 53 is formed in the area where the reel body 2a and the lid member 2b split apart. The switching member 52 includes a hill-shaped cam portion 60 having two inclined surfaces 60a, 60b; and, formed unitarily with the cam portion 60, a neck portion 61 and a brim portion 62. Inclined surface 60a is an oblique face whose end downstream in the rotor 3 line-retrieving rotational direction—indicated by the arrow in FIG. 6—projects more frontward toward the rotor 3 than the upstream end. The amount by which the oblique face that is inclined surface 60b projects diminishes heading from where inclined surface 60a peaks, toward the line-retrieving rotational direction downstream-end. The amount that the peak edge 60c projects where inclined surfaces 60a, 60b project most is established such that when the shifting member 51 with its rear-end portion 51c having come into contact with the inclined surface 60a has pressed the bail arm 17 toward the line-retrieving posture, the shifting member 51 will have passed the dead point of the toggle-spring mechanism 50.

The neck portion 61 is of a size that fits into the notch 53, and forms between the cam portion 60 and the brim portion 62 a gap of approximately the same dimension as the wall thickness of the flange portion 2d. The brim portion 62 is larger in cross-section than the neck portion 61, and is in contact with the backside of the flange portion 2d. Since the cam portion 60 has the inclined surface 60b, even if the rotor 3 is reversed in the line-reel-out direction forcibly and the shifting member 51 comes into contact with the switching member 52 when the bail arm 17 is in the line-releasing posture, the shifting member 51 of the bail-tripping mechanism 18 will be guided by the switching member 52 smoothly on the inclined surface 60b, thereby keeping switching member 52 from being damaged. Alternatively, the switching member 52 having the two inclined surfaces 60a, 60b in this way may be provided as a switching portion formed integrally with the reel unit 2.

When attaching the lid member 2b to the reel body 2a, the thus-configured switching member 52 may be fixed to the reel unit 2 just by fitting the neck portion 61 into the notch 53 on the side of the reel body 2a and fastening the lid member 2b on the reel body 2a with screws. Thus, the switching member 52 can be fastened to the reel unit 2 simply, without having to use separate fastening components. Further, where the reel unit 2 is corrosion-susceptible, inasmuch as the switching member 52 that comes into contact with the shifting member 51 is a separate component from the reel unit 2, the reel unit 2 will not be scratched during the flipping over of the bail arm 17. This therefore prevents corrosion due to scratches. Furthermore, because the switching member 52 mounted on the reel unit 2 is made of a synthetic polymer that is a dielectric, the reel unit 2 will not electrolytically corrode even when the switching member 52 is brought into contact with the reel unit 2.

Rotor Braking Mechanism Configuration

The rotor braking mechanism 54 brakes the rotor 3 when the bail arm 17 has swung into the line-releasing posture, and includes the shifting member 51 and the brake element 65 fitted in the mounting groove 2f formed along the basal end of the cylindrical portion 2e. In particular, the shifting member 51 is a component of the bail-tripping mechanism 18, and at the same time is a component of the rotor braking mechanism 54.

The brake element 65 is furnished for braking rotation of the rotor 3 when the bail arm 17 is in the line-releasing posture. The brake element 65 is a ring-shaped component, rectangular in cross section, made of an elastic material composed of a synthetic rubber such as, for example, styrene-butadiene rubber (SBR), acrylonitrile-butadiene rubber, butadiene rubber, isoprene rubber, chloroprene rubber, silicone rubber or urethane rubber. The braking face 65a, consisting of a flat circumferential surface except in a section that avoids the switching portion 52, is formed along the outer periphery of the brake element 65. The brake element 65 is mounted along the basal outer periphery of cylindrical portion 2e, which is D-shaped in the cross-section. Consequently, the brake element 65 is fitted into the D-shape in plan view. The linear portion of the brake element 65 is provided to dodge the switching portion 52. At the fore-end rim of the braking face 65a of the brake element 65 a piloting surface 65b (see FIG. 6) is formed in continuity with the braking face 65a. The piloting surface 65b is formed so that its upstream end is more remote from the shifting member 51 than its down stream end is. The upstream end is on the upstream side relative to the direction in which the shifting member 51 shifts as the bail arm 17 pivots into the line-releasing posture. In this embodiment, the piloting surface 65b has a round circular surface that is in continuity with the braking face 65a. By forming the oblique piloting surface 65b in continuity with the braking face 65a in this way, when the shifting member 51 comes into contact with the brake element 65, the end face of the round rear-end portion 51c contacts the braking face 65a smoothly by way of the piloting surface 65b of the brake element 65. Accordingly, the switching of the bail arm 17 between the two postures can be achieved smoothly.

Restraining Mechanism Configuration

Figure 7:
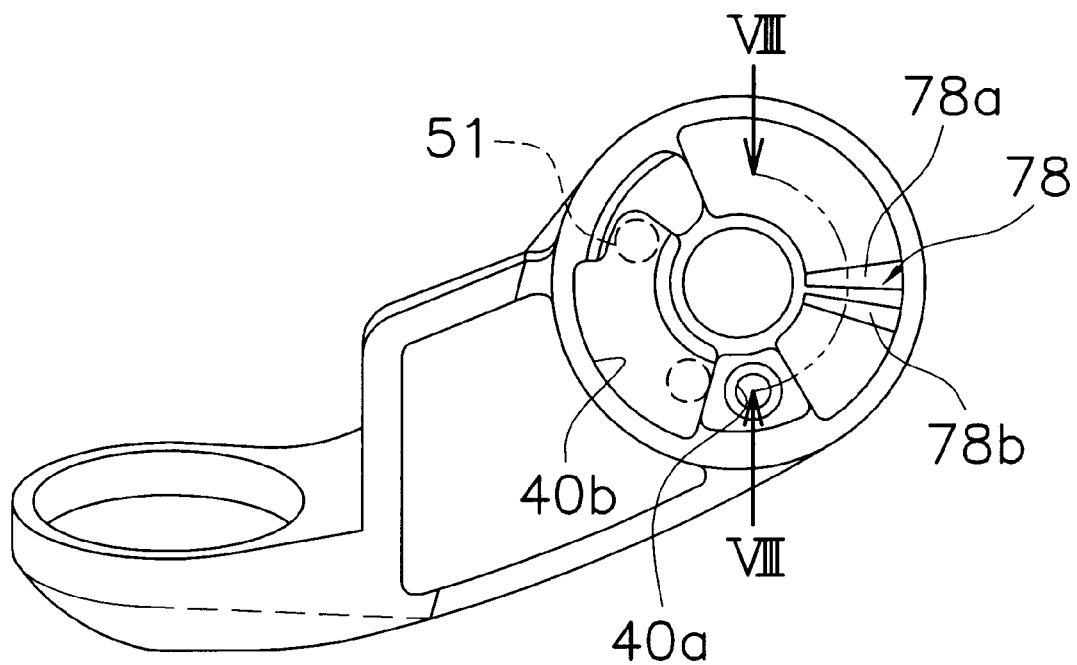
FIG. 7 is a perspective view of first bail-support member in accordance with the first embodiment of the present invention.
Figure 8:
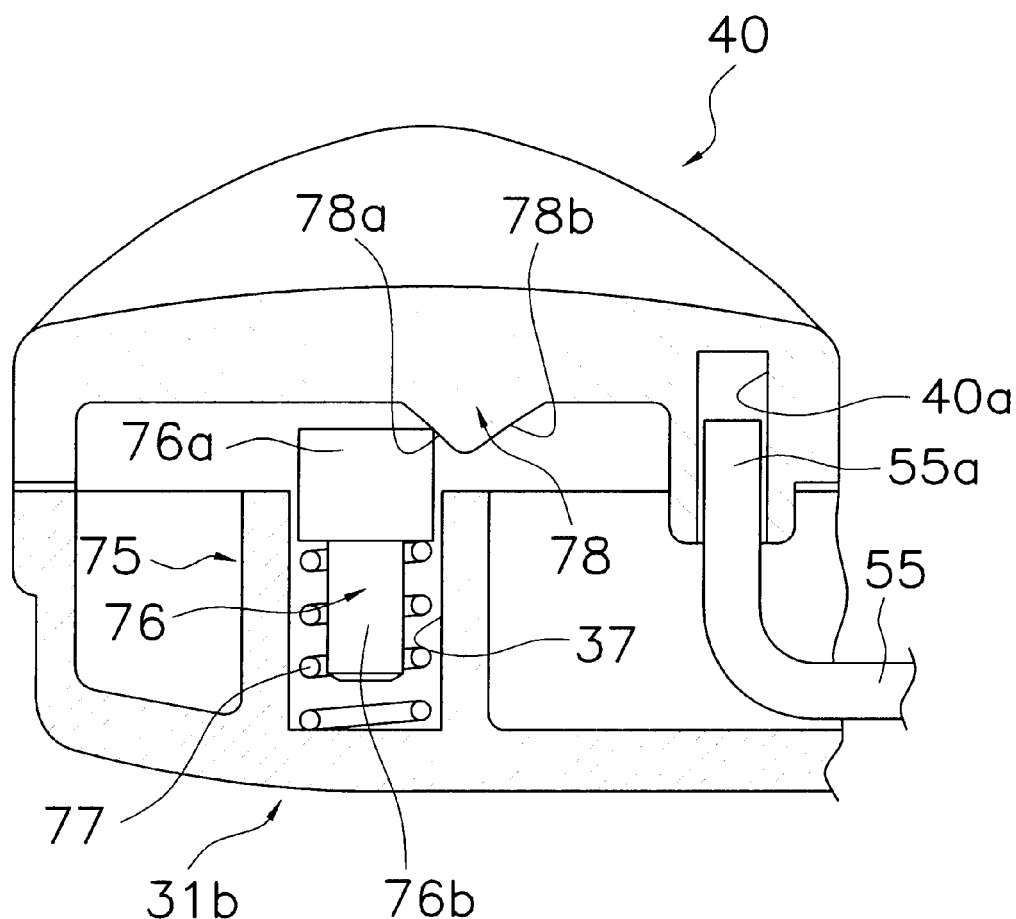
FIG. 8 is a cross-sectional view of first bail-support member as viewed through VIII—VIII in FIG. 7.

As seen in FIG. 8, the restraining mechanism 75 is provided in opposing portions between the bail arm 17 and the first arm portion 31b of the rotor 3. The restraining mechanism 75 is a machine that restrains the bail arm 17 from returning into the line-retrieving posture when the bail arm 17 is situated in the line-releasing posture. When the bail arm 17 swings into the line-retrieving posture, the restraining mechanism 75 releases the restraint before the rear-end portion 51c of the shifting member 51 reaches the peak edge 60c of the inclined surface 60a. The restraining mechanism 75 as shown in FIGS. 7 and 8 includes a restraining pin 76 fitted in a mounting hole 37 in the first arm portion 31b, a coil spring 77 that urges the restraining pin 76 toward the bail arm 17, and a pressing portion 78 furnished on the first bail-support member 40.

The restraining pin 76 is made of metal and has a larger-diameter abutment portion 76a and a smaller-diameter spring-fitting portion 76b. The fore end of the coil spring 77 contacts the stepped portion between the abutment portion 76a and the spring-fitting portion 76b. The coil spring 77 is disposed along the outer periphery of the spring-fitting portion 76b, wherein the coil spring 77 urges the restraining pin 76 toward the first bail-support member 40. The pressing portion 78 has two inclined surfaces 78a, 78b and is formed projecting toward the first arm portion 31b. The pressing portion 78 is disposed in a position past the restraining pin 76, to release the restraint before the rear-end portion 51c of the shifting member 51 reaches the peak edge 60c of the inclined surface 60a during a swing from the line-releasing posture into the line-retrieving posture. Specifically, as illustrated in FIG. 9(a), the pressing portion 78 is disposed so as to be, when in the line-releasing-posture situation, located beyond the restraining pin 76 upstream in the direction pivoting into the line-retrieving posture, which is indicated by the arrow. As illustrated in FIG. 9(b), in the midst of a swing into the line-retrieving posture, the pressing portion 78 passes past the restraining pin 76 before the toggle-spring mechanism 50 arrives at the dead point.

The toggle-spring mechanism 50 in the thus-configured bail-tripping mechanism 18 is enabled to assume the first position as shown in FIG. 3(a), and the second position as shown in FIG. 3(b). The first position corresponds to the line-retrieving posture of the bail arm 17, and the second position corresponds to the line-releasing posture of the bail arm 17. Likewise, the shifting member 51 can slide back and forth, with its rear-end portion 51c being guided by the guide groove 36, into the first position (parted-off position) shown in FIG. 3(a), and the second position (contact position) shown in FIG. 3(b). The first position (parted-off position) corresponds to the line-retrieving posture, while the second position (contact position) corresponds to the line-releasing posture. In the second position (contact position) the end face of the rear-end portion 51c of the shifting member 51 contacts on the brake element 65 depth-ward beyond the front-end face thereof, such that the braking face 65a is slightly compressed. Therefore, even if the shifting position of shifting member 51 fluctuates in the axial direction, in particular the second position (contact position), the braking force will not fluctuate.

Further, in the second position (contact position), when the rotor 3 rotates in the line-retrieving direction through operation of the handle 1, the rear-end portion 51c of the shifting member 51 collides with the inclined surface 60a of the switching portion 52 and is turned. The shifting member 51 is pressed frontward, toward the first position (parted-off position). The bail arm 17, at the moment it goes by the dead point of the toggle-spring mechanism 50, is restored into the line-retrieving posture. At this time, the restraint by the restraining pin 76 of the restraining mechanism 75 is released by the time the toggle-spring mechanism 50 goes beyond the dead point.

Other Configurations

As shown in FIG. 2, an anti-reverse mechanism 70 for prohibiting/allowing reversal of the rotor 3 is disposed inside the cylindrical portion 30 of the rotor 3. The anti-reverse mechanism 70 has a roller-type one-way clutch. The anti-reverse mechanism 70 prohibits/allows reversal of the rotor 3 by switching between an operational state and a non-operational state of the one-way clutch.

The spool 4 is arranged in between the first rotor arm 31 and the second rotor arm 32 of the rotor 3, and is mounted on the fore end of the spool shaft 15 with the drag mechanism 71 therebetween. The spool 4 includes a bobbin trunk portion 4a outer-peripherally onto which fishing line is wound; a skirt portion 4b formed unitarily with the rear part of the bobbin trunk portion 4a; and a flange portion 4c formed unitarily with the front end of the bobbin trunk portion 4a.

Reel Handling and Operation

During casting, the bail arm 17 is flipped over into the line-releasing posture with the rotor 3 being put into the reversal-prohibited state by the anti-reverse mechanism 70 and the bail arm 17 being held with the hand. When the bail arm 17 is flipped over into the line-releasing posture, the first bail-support member 40 and the second bail-support member 42 pitch rearward, disposing the bail-tripping mechanism 18 in the second position shown in FIG. 3(b). In this situation, when the toggle-spring mechanism 50 has passed the dead point, the pressing portion 78 goes beyond the restraining pin 76 in the restraining mechanism 75. With the bail arm 17 pitched into the line-releasing posture, fishing line can be readily reeled out from the spool 4. In this casting situation, since the bail arm 17 is restrained such that it is kept from returning from the line-releasing posture to the line-retrieving posture, even if the urging force of the toggle-spring mechanism 50 is made weaker to allow the bail arm 17 to trip easily by, the bail arm 17 will be kept from flipping over to the line-retrieving posture under inertial force from casting.

By the pivoting of the first bail-support member 40 in pivoting from the line-retrieving posture to the line-releasing posture the rod 55 in the toggle spring mechanism 50 is pivoted counterclockwise in FIG. 3(a) while retracting laggingly, arriving in the second position shown in FIG. 3(b). Therein the rod 55 retracts until the dead point is passed. When the dead point is passed, the urging force of the coil spring 57 advances the rod 55, whereby the bail arm 17 is switched into the line-releasing posture, and is retained in that posture. When this dead point is passed, the pressing portion 78 of the restraining mechanism 75 surpasses the restraining pin 76 to restrain the bail arm 17 from pivoting toward the line-retrieving posture. Meanwhile, at the moment the pressing portion 78 goes beyond the restraining pin 76, the restraining pin 76 abruptly knocks on the first bail-support member 40, issuing sound. In this manner, one can tell that the bail arm 17 has switched postures.

When the bail arm 17 swings into the line-releasing posture, attendant on this pivoting the shifting member 51 shifts from the parted-off position to the contact position, and the tip of the rear-end portion 51c of the shifting member 51 comes into elastic contact with the brake element 65. Consequently the rotor 3 is braked and its rotational phase is retained. Inasmuch as the rotor 3 is braked only through friction by elastic contact with the brake element 65, however, the rotational phase of the rotor 3 may be adjusted simply by turning the rotor 3 by hand or by means of the handle 1. By the same token, inasmuch as frictional force brakes the rotor 3 and sustains its rotational phase, there will be no rotating of the rotor 3 when the bail arm 17 has been put into the line-releasing posture. This consequently eliminates the nuisance of the rotor 3 unintentionally rotating when casting or feathering. Nevertheless, since the rotor 3 is only braked by friction, the rotational phase of the rotor 3 can be adjusted easily applying force to the rotor 3. Likewise, inasmuch as the shifting member 51 is urged toward the braking face 65a by the compression spring 68, even if chatter is produced in the shifting member 51 in the pressing direction toward the braking face 65a due to discrepancies in how the shifting member 51 is attached, the chatter will be nullified by the compression spring 68. Accordingly, the shifting member 51 will be pressed upon with constant urging force by the compression spring 68. This therefore suppresses fluctuations in braking force due to chatter in the compression direction.

In this situation, the fishing rod is cast while hooking the fishing line with the index finger of the hand with which the fishing rod is held. The fishing line is then flung out vigorously under the weight of the terminal tackle. At this time, as described earlier the bail arm 17 is restrained by the restraining mechanism 75 to keep the bail arm 17 from returning from the line-releasing posture to the line-retrieving posture. In particular, as shown in FIG. 9(a), inasmuch as the restraining pin 76 is situated in a position that has surpassed the pressing portion 78, the bail arm 17 is blocked by the pressing portion 78, keeping the bail arm 17 from, under inertial force, flipping over centering on its pivotal center O.

After casting, when the handle 1 is turned in the line-retrieving direction with the left hand for example while the bail arm 17 is still sustained in the line-releasing posture, the rotor driving mechanism 5 rotates the rotor 3 in the line-retrieving direction. When the rotor 3 rotates in the line-retrieving direction, the bail-tripping mechanism 18 restores the bail arm 17 into the line-retrieving posture.

To be more specific, in FIGS. 5 and 6, the shifting member 51 turns clockwise together with the rotor 3. The rear-end portion 51c of the shifting member 51 then abuts against inclined surface 60a of the switching member 52 fastened onto the reel unit 2 side. This pushes the shifting member 51 frontward, switching it into the first position (parted-off) position indicated by the phantom lines in FIG. 6, and pivots the first bail-support member 40 into the line-retrieving posture. In the mean time, the rod 55 in the toggle spring mechanism 50 pivots from the second position, shown in FIG. 3(b), toward the first position, shown in FIG. 3(a). Then, when the toggle-spring mechanism 50 goes past the dead point before reaching the peak edge 60c of inclined surface 60a under the urging force of the coil spring 57, the rod 55 advances out, and the bail arm 17 is switched into the line-retrieving posture and is retained in that posture. The resistance from the restraining mechanism 75 is broken before the dead point of the toggle-spring mechanism 50 is passed. Specifically, as shown in FIG. 9(b), the pressing portion 78 goes beyond the restraining pin 76, releasing the restraint that is due to the pressing portion 78, prior to reaching the dead point, where the toggle-spring mechanism 50 is disposed on a straight line that connects the pivotal center O and the rear end of the toggle-spring mechanism 50. Therefore, the bail arm 17 may be returned to the line-retrieving posture without intensified urging force from the toggle-spring mechanism 50.

In this manner, it is possible to prevent ill-effects that are produced by making the wire diameter of the spring thick in order to intensify the spring force of the toggle-spring mechanism. In particular, if the wire diameter is to be thick, the coil diameter and number of coils need to be increased in order to improve durability. This therefore scales up the spring size. Therefore, the size of the rotor 3 has to be increased accordingly in order to accommodate the spring.

When the bail arm 17 is restored to the line-retrieving posture, the first bail-support member 40 and the second bail-support member 42, as shown in FIGS. 1 and 2, are each upright extending frontward. When the bail arm 17 returns to the line-retrieving posture, fishing line is guided to the spool 4 by the bail arm 17, and wrapped onto the outer periphery of the spool 4.

Figure 10:
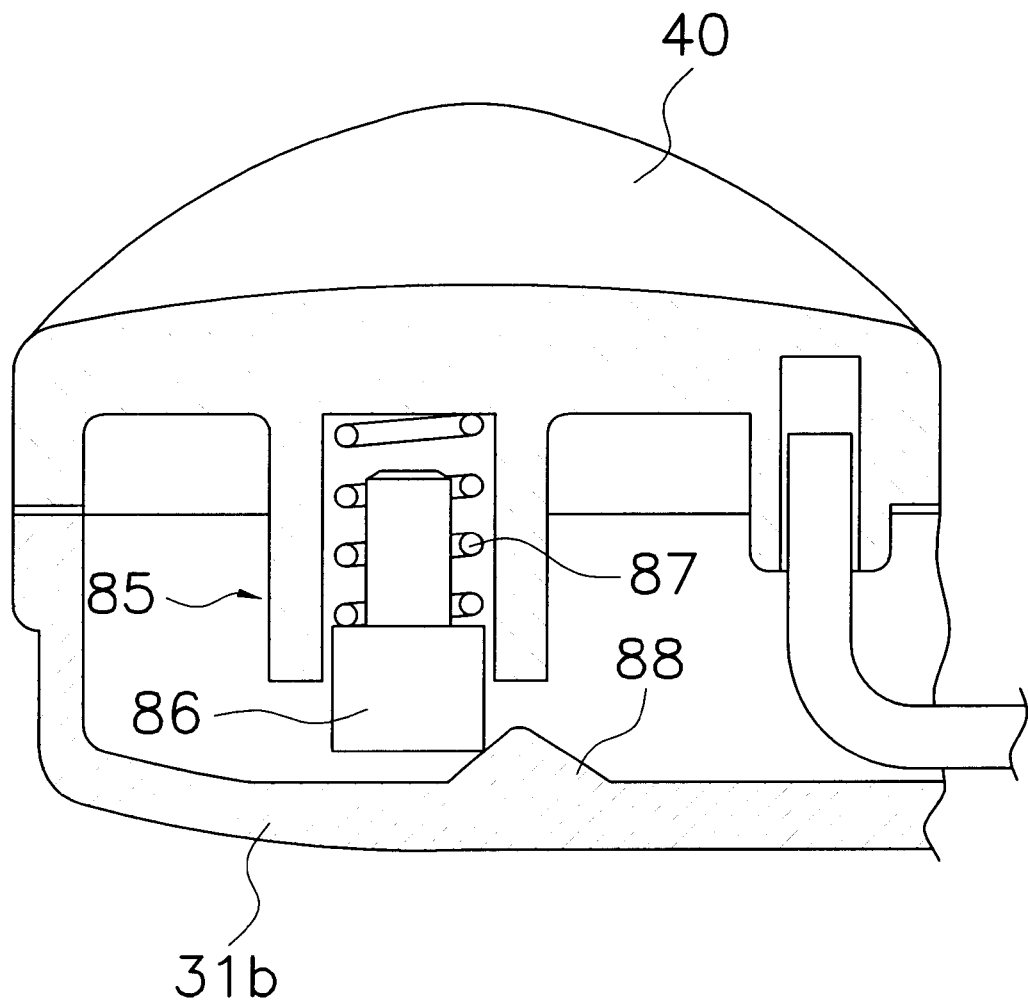
FIG. 10 is a cross-sectional view of first bail-support member in accordance with a second embodiment, corresponding to FIG. 8.

Other Embodiments (a) In the embodiment described above, the restraining pin 76 of the restraining mechanism 75 is built into the first arm portion 31b, and the pressing portion 78 is formed in the first bail-support member 40. As illustrated in FIG. 10, however, they may be furnished oppositely.

More specifically, the restraining mechanism 85 in the embodiment shown in FIG. 10 includes a restraining pin 86 and a coil spring 87 fitted into the first bail-support member 40, and a pressing portion 88 formed on the first arm portion 31b. With the configuration like this the same effects as in the foregoing embodiment are obtained.

Figure 11:
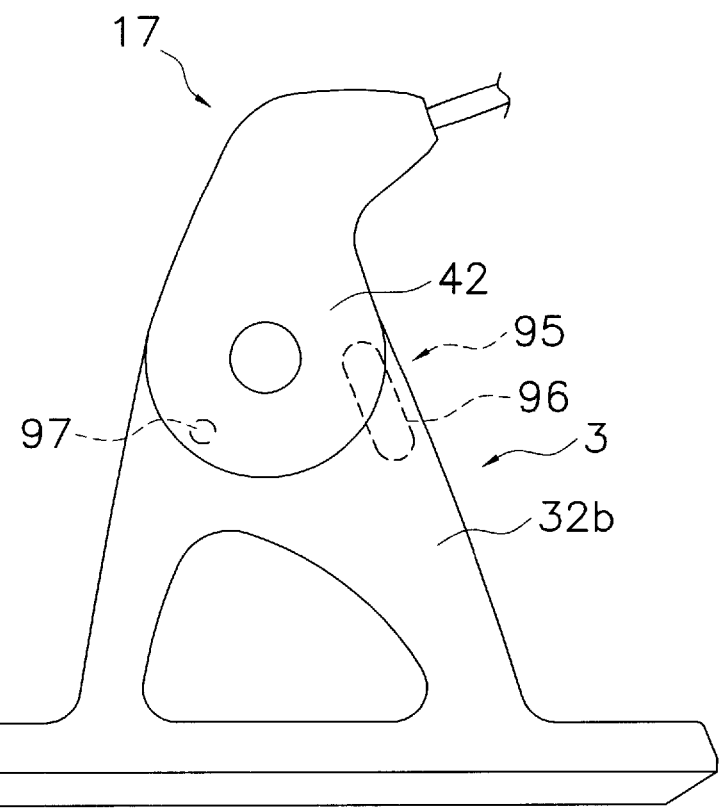
FIG. 11 is a plan view of second rotor arm showing restraining mechanism in accordance with the second embodiment, with the bail arm being in the line-retrieving posture in FIG. 11(a) and in the line-releasing posture in FIG. 11(b).
Figure 11:
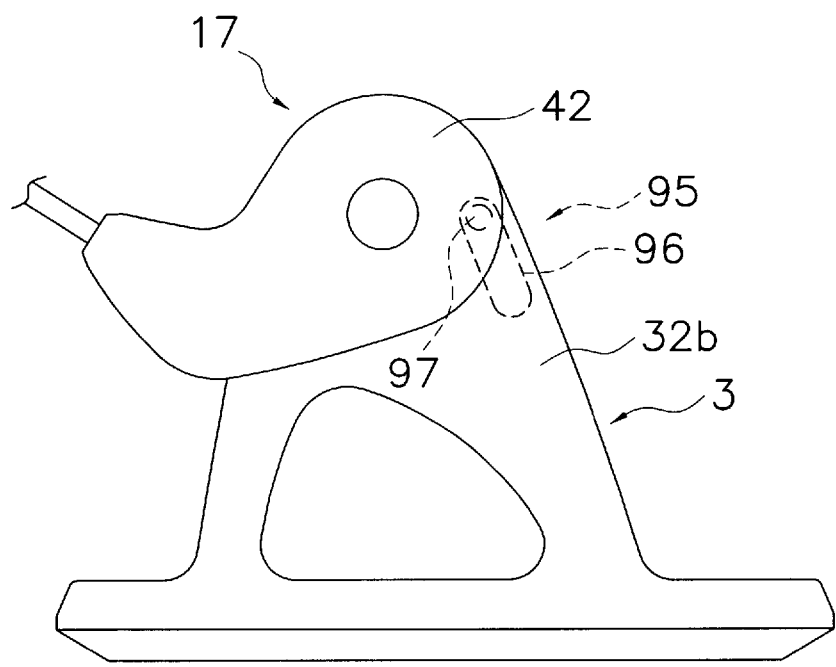

(b) In the foregoing embodiment, the restraining mechanism 75 is arranged in between the first bail-support member 40 and the first arm portion 31b, as shown in FIG. 8. As illustrated in FIG. 11, however, a restraining mechanism 95 may be arranged in between the second bail-support member 42 and the second arm portion 32b.

The restraining mechanism 95 in the embodiment shown in FIG. 11 includes an elastic member 96 provided on the second arm portion 32b of the rotor 3, and a contact portion 97 provided on the second bail-support member 42 of the bail arm 17. The elastic member 96 is made for example of synthetic rubber, and is fastened with a suitable fastening means such as, e.g., an adhesive to the face of the second arm portion 32b that opposes the second bail-support member 42. The contact portion 97 is formed projecting from the opposing face of the second bail-support member 42. When the contact portion 97 comes into contact with the elastic member 96, resistance is imparted to the second bail-support member 42, thereby retaining the bail-support member 42 in the line-releasing posture. The contact portion 97 is formed so as to be parted away from the elastic member 96 when the bail arm 17 is in the line-retrieving posture shown in FIG. 11(a), and to be in contact with the elastic member 96 when in the line-releasing posture shown in FIG. 11(b). The contact portion 97 parts away from the elastic member 96 before the toggle-spring mechanism 50 passes the dead point in the midst of a swing from the line-releasing posture into the line-retrieving posture. Accordingly, since the contact portion 97 parts away from the elastic member 96 in the midst of a swing into the line-retrieving posture, the resistance stops before the toggle-spring mechanism 50 passes the dead point.

The configuration of the restraining mechanism 95 composed in this way is simpler compared with the one in the embodiments described above. Here, the elastic member 96 may be mounted on the second bail-support member 42, and the contact portion 97 may be furnished on the second arm portion 32b. Likewise, the elastic member 96 and the contact portion 97 may be provided in between the first bail-support member 40 and the first arm portion 31b.

(c) In the foregoing embodiments, the brake element is of synthetic rubber manufacture. Alternatively, the brake element can be made of any other material that has elasticity, such as a metal, a synthetic polymer, a wood such as cork, or a leather material.

(d) In the embodiments described above, the shifting member 51 is constituted by a filament material made of metal. However, the structure of the shifting member is not thereby limited. The shifting member may be in any form as long as its rear-end portion shifts back and forth and comes into contact with the braking face on the brake element.

(e) In the foregoing embodiments, the pressing portion 78 of the restraining mechanism 75 is, when the bail arm 17 is in the line-releasing posture, disposed on the upstream side with respect to the restraining pin 76 relative to the swinging direction. The swinging direction is the direction toward the line-retrieving posture indicated by the arrow in FIG. 9. The pressing portion 78 is further positioned such that the pressing portion 78 passes the restraining pin 76 by the time the toggle-spring mechanism 50 reaches the dead point during the swinging toward the line-retrieving posture. However, the present invention is not limited to this arrangement. The pressing portion 78 can be positioned such that the restraint is released by the time the rear-end portion 51c of the shifting member 51 reaches the peak edge 60c of the inclined surface 60a, instead of by the time the rear-end portion 51c reaches the dead point.

(f) In the foregoing embodiments, a front-drag model spinning reel was described by way of example, but the present invention may be applied to other types of spinning-reel bail-tripping devices that restore a pivoting bail arm into a line-retrieving posture, such as rear-drag model spinning reels and lever-drag model spinning reels.

In accordance with the present invention, inasmuch as the bail arm when in the line-releasing posture is restrained by restraining means to keep it from returning to the line-retrieving posture, the bail arm is securely retained in the line-releasing posture. Likewise, since the restraint from the restraining means is released before the pressing-force-generating peak edge of the first inclined face is reached during swinging into the line-retrieving posture, the spring force of the toggle spring needs not be intensified, which makes it easy to return the bail arm to the line-retrieving posture.

As used herein, the following directional terms "forward," "rearward," "above," "downward," "vertical," "horizontal," "below" and "transvers" as well as any other similar directional terms refer to those directions of a device equipped with the present invention. Accordingly, these terms, as utilized to describe the present invention should be interpreted relative to a device equipped with the present invention.

The terms of degree such as "substantially," "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2001-392511. The entire disclosure of Japanese Patent Application No. 2001-392511 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A bail-tripping device of a spinning reel for returning a bail arm from a line-releasing posture to a line-retrieving posture as a rotor rotates in a line-retrieving direction, the bail arm being mounted on the rotor so as to be pivotable between the line-retrieving and line-releasing postures, the rotor being mounted rotatably in a reel unit of the spinning reel, said bail-tripping device comprising:

a shifting member furnished on the rotor and having a fore end that is pivotably interlocked with a first portion of the bail arm and a rear end that is shiftable between a first position and a second position as the bail arm pivots, the first position being parted away from the reel unit and corresponding to the line-retrieving posture, the second position adjoining the reel unit and corresponding to the line-releasing posture;

a toggle-spring mechanism having a fore end that is pivotably interlocked with a second portion of the bail arm that is different from the first portion, said toggle-spring mechanism defining a dead point and urging and toggling the bail arm between the line-retrieving and line-releasing postures;

a switching portion provided on a front portion of the reel unit and having a first inclined face that includes upstream and downstream ends relative to the line-retrieving direction of the rotor, said downstream end projecting from said upstream end and continuing onto a peak edge, said first inclined face coming into contact with said rear end of said shifting member in the second position when the rotor rotates in the line-retrieving direction, such that said shifting member passes beyond the dead point of said toggle-spring mechanism and moves toward the first position; and restraining means furnished in between the bail arm and the rotor, for restraining the bail arm from returning to the line-retrieving posture when the bail arm is in the line-releasing posture, and for releasing the restraint before said rear end of said shifting member reaches said downstream end of said first inclined face as the rotor rotates in the line-retrieving direction while the bail arm is in the line-releasing posture.

2. The spinning-reel bail-tripping device as set forth in claim 1, wherein said restraining means releases the restraint as the bail arm pivots to the line-retrieving posture, by the time said toggle-spring mechanism passes beyond the dead point.

3. The spinning-reel bail-tripping device as set forth in claim 1, wherein said fore end of said shifting member is bent toward a pivotal center of the bail arm such that said fore end parallels a pivotal axis of the bail arm, said rear end of said shifting member is bent toward a rotational axis of the rotor, an intermediate portion of said shifting member between said fore end and said rear end is substantially paralleling the rotational axis of the rotor, said intermediate portion is interlocked with the rotor and shiftable front-to-rear, and said fore end is interlocked with an engagement recess formed in the bail arm so as to be pivotable.

4. The spinning-reel bail-tripping device as set forth in claim 1, wherein said restraining means includes:
a restraining pin mounted on one of the bail arm and the rotor so as to be shiftable toward and away from the other,
an urging member for urging said restraining pin toward the other of the bail arm and the rotor, and
a pressing portion provided on the other of the bail arm and the rotor, said pressing portion projecting toward the one of the bail arm and the rotor so as to press said restraining pin in its retracting direction; and said pressing portion is positioned past said restraining pin by the time said toggle spring mechanism passes the dead point.

5. The spinning-reel bail-tripping device as set forth in claim 1, wherein said restraining means includes:
an elastic member provided on one of the bail arm and the rotor; and
a contact portion provided on the other of the bail arm and the rotor so as to be in contact with said elastic member when the bail arm is in the line-releasing posture, and to be parted away from said elastic member by the time said toggle-spring mechanism passes the dead point.

6. The spinning-reel bail-tripping device as set forth in claim 1, wherein said toggle-spring mechanism includes:
a shaft member having one end that is interlocked with the bail arm; and
a spring element having one end that is interlocked with said shaft member and the other end that is interlocked with the rotor, said spring element being guided by the rotor and urging said shaft member.

7. The spinning-reel bail-tripping device as set forth in claim 1, wherein the dead point of said toggle-spring mechanism is positioned at a range of 80% to 95% of the sweeping distance of the bail arm from the line-retrieving posture toward the line-releasing posture.

8. The spinning-reel bail-tripping device as set forth in claim 1, wherein said switching portion is formed in continuity with said peak edge of said first inclined face, and has a second inclined face having upstream and downstream ends relative to the line-retrieving direction of the rotor, said upstream end of said second inclined face continuing from said peak edge and projecting from said downstream end of said second inclined face.

9. The spinning-reel bail-tripping device as set forth in claim 1, further comprising a brake element made of an elastic material and provided on the front portion of the reel body so as to be contactable with said rear end of said shifting member when said shifting member is shifted into the second position.

10. The spinning-reel bail-tripping device as set forth in claim 9, wherein at least a part of said first inclined face of said switching-portion protrudes more toward the rotor than a portion of said brake element that contacts with said shifting member.

11. The spinning-reel bail-tripping device as set forth in claim 9, wherein said brake element has a braking surface including a circumferential face, at least a portion of its outer periphery of which is flat; and said rear end of said shifting member comes into contact with said braking surface when said shifting member is shifted into the second position.

12. The spinning-reel bail-tripping device as set forth in claim 4, wherein said restraining pin is mounted on the rotor, and said pressing portion is provided on the bail arm, projecting toward the rotor.

13. The spinning-reel bail-tripping device as set forth in claim 5, wherein said elastic member is provided on the rotor, and said contact portion is provided on the bail arm.

14. A spinning reel, comprising:

a handle;

a reel unit rotatably carrying said handle;

a rotor rotatably carried on a front portion of said reel unit so as to be rotatable in a line-retrieving direction, said rotor including
a rotor unit,
a bail arm mounted on a fore end of said rotor unit so as to be pivotable between a line-releasing posture and a line-retrieving posture, and
a bail-tripping mechanism mounted on said rotor unit for returning said bail arm from the line-releasing posture into the line-retrieving posture as said rotor rotates in the line-retrieving direction, said bail-tripping mechanism including
a shifting member furnished on said rotor and having a fore end that is pivotably interlocked with a first portion of said bail arm and a rear end that is shiftable between a first position and a second position as said bail arm pivots, the first position being parted away from the reel unit and corresponding to the line-retrieving posture, the second position adjoining the reel unit and corresponding to the line-releasing posture, a toggle-spring mechanism having a fore end that is pivotably interlocked with a second portion of said bail arm that is different from the first portion, said toggle-spring mechanism defining a dead point and urging and toggling said bail arm between the line-retrieving and line-releasing postures, a switching portion provided on a front portion of said reel unit and having a first inclined face that includes upstream and downstream ends relative to the line-retrieving direction of said rotor, said downstream end projecting from said upstream end and continuing onto a peak edge, said first inclined face coming into contact with said rear end of said shifting member in the second position when said rotor rotates in the line-retrieving direction, such that said shifting member passes beyond the dead point of said toggle-spring mechanism and moves toward the first position, and restraining means furnished in between said bail arm and said rotor, for restraining said bail arm from returning to the line-retrieving posture when said bail arm is in the line-releasing posture, and for releasing the restraint before said rear end of said shifting member reaches said downstream end of said first inclined face as said rotor rotates in the line-retrieving direction while said bail arm is in the line-releasing posture; and a spool onto a circumferential surface of which fishing line winds, said spool being disposed on a front portion of said rotor so as to be shiftable in a front and rear.

15. The spinning reel as set forth in claim 14, wherein said restraining means releases the restraint as said bail arm pivots to the line-retrieving posture, by the time said toggle-spring mechanism passes beyond the dead point.

16. The spinning reel as set forth in claim 14, wherein said restraining means includes:
    a restraining pin mounted on one of said bail arm and said rotor so as to be shiftable toward and away from the other,
    an urging member for urging said restraining pin toward the other of said bail arm and said rotor, and
    a pressing portion provided on the other of said bail arm and said rotor, said pressing portion projecting toward the one of said bail arm and said rotor so as to press said restraining pin in its retracting direction; and said pressing portion is positioned past said restraining pin by the time said toggle spring mechanism passes the dead point.

17. The spinning reel as set forth in claim 16, wherein said restraining pin is mounted on said rotor, and said pressing portion is provided on said bail arm, projecting toward said rotor.

18. The spinning reel as set forth in claim 14, wherein said restraining means includes:
    an elastic member provided on one of said bail arm and said rotor; and
    a contact portion provided on the other of said bail arm and said rotor so as to be in contact with said elastic member when said bail arm is in the line-releasing posture, and to be parted away from said elastic member by the time said toggle-spring mechanism passes the dead point.

19. The spinning reel as set forth in claim 18, wherein said elastic member is provided on said rotor, and said contact portion is provided on said bail arm.

20. The spinning reel as set forth in claim 14, wherein said toggle-spring mechanism includes:
    a shaft member having one end that is interlocked with said bail arm; and
    a spring element having one end that is interlocked with said shaft member and the other end that is interlocked with said rotor, said spring element being guided by said rotor and urging said shaft member.

* * * * *